(12) United States Patent
Müller

(10) Patent No.: US 7,762,505 B2
(45) Date of Patent: Jul. 27, 2010

(54) FIXING DEVICE FOR FIXING CAMERAS AND OTHER OPTICAL EQUIPMENT TO STANDS OR FOR CONNECTION TO OTHER ACCESSORIES

(75) Inventor: Jochen Müller, Gräfelfing (DE)

(73) Assignee: Velbon K.K., Tokyo (JP)

( * ) Notice: Subject to any disclaimer, the term of this patent is extended or adjusted under 35 U.S.C. 154(b) by 561 days.

(21) Appl. No.: 11/575,996

(22) PCT Filed: Sep. 27, 2005

(86) PCT No.: PCT/EP2005/010427

§ 371 (c)(1),
(2), (4) Date: Mar. 26, 2007

(87) PCT Pub. No.: WO2006/040005

PCT Pub. Date: Apr. 20, 2006

(65) Prior Publication Data

US 2007/0290103 A1     Dec. 20, 2007

(30) Foreign Application Priority Data

Sep. 27, 2004   (DE)  .................... 20 2004 015 006 U

(51) Int. Cl.
*F16M 11/04* (2006.01)
(52) U.S. Cl. ............. 248/187.1; 248/176.1; 248/346.03
(58) Field of Classification Search ............. 248/187.1, 248/176.1, 310, 346.03
See application file for complete search history.

(56) References Cited

U.S. PATENT DOCUMENTS

| | | | |
|---|---|---|---|
| 534,912 A * | 2/1895 | Perry | ...................... 248/187.1 |
| 2,824,503 A | 2/1958 | Weiss | |
| 2,880,490 A | 4/1959 | Rizzatti et al. | |
| 3,184,196 A * | 5/1965 | Dent | ........................ 248/187.1 |
| 3,356,325 A * | 12/1967 | Schnase | ................... 248/187.1 |
| 3,549,113 A | 12/1970 | Pagliuso | |
| 4,320,885 A * | 3/1982 | Kawazoe | ................. 248/187.1 |
| 6,460,815 B1 | 10/2002 | Thaler | |
| 6,663,064 B1 * | 12/2003 | Minelli et al. | ............ 248/205.5 |

FOREIGN PATENT DOCUMENTS

| | | |
|---|---|---|
| GB | 2 052 782 A | 1/1981 |
| JP | 5-150352 A | 6/1993 |
| JP | 2001-264861 A | 9/2001 |

OTHER PUBLICATIONS

International Search Report for PCT/EP2005/010427 mailed Jan. 19, 2006.

* cited by examiner

*Primary Examiner*—J. Allen Shriver, II
*Assistant Examiner*—Bradley H Duckworth
(74) *Attorney, Agent, or Firm*—McDermott Will & Emery LLC

(57) ABSTRACT

A fixing device for fixing cameras and other optical devices to stands or for connecting them to other accessories, includes an adapter journal joined to the camera or other optical devices and a receiving device connected to the stand or other accessories and which is provided with an opening for receiving the adapter journal, and a rotatable locking device. The opening is configured as an insert opening on a part which can be displaced axially in an outward manner by means of housing part of the receiving device such that the adapter journal can be inserted radially into the insert opening.

6 Claims, 4 Drawing Sheets

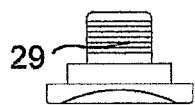
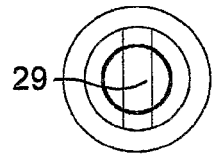
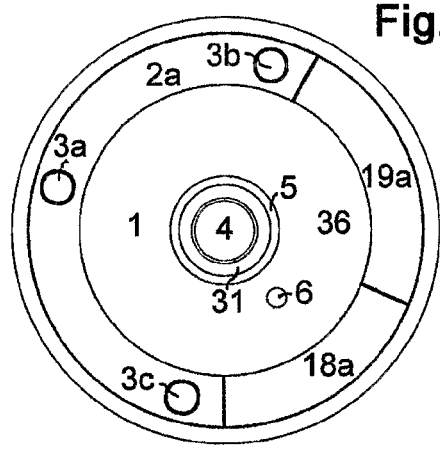
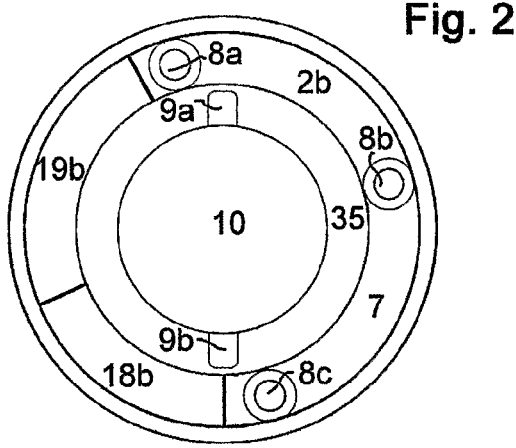
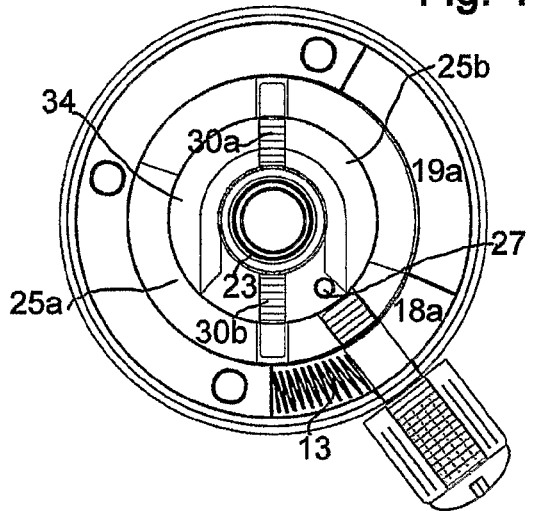
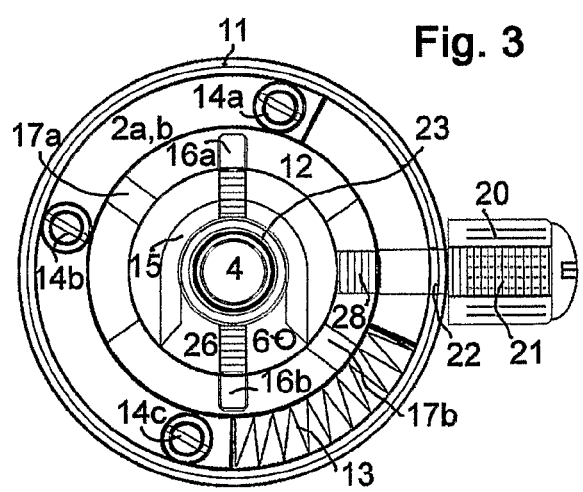

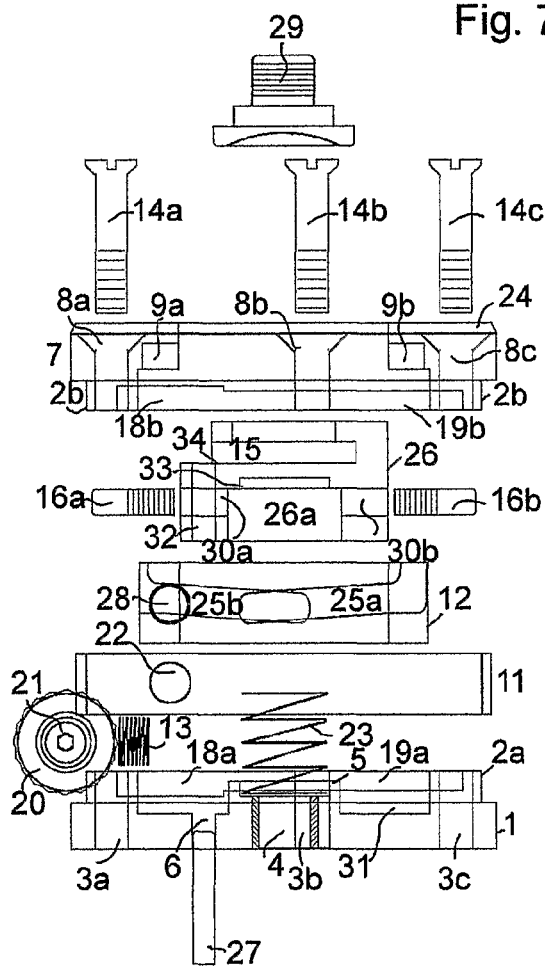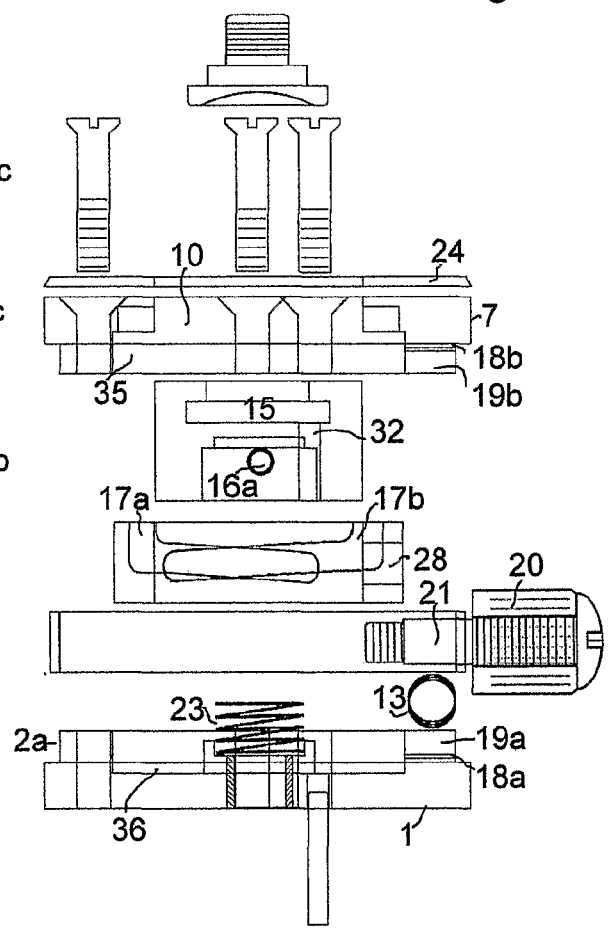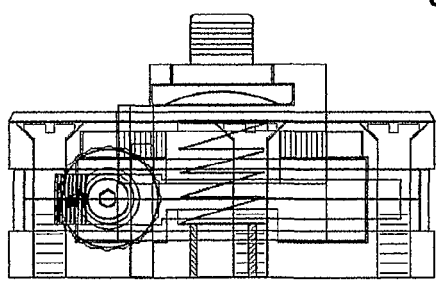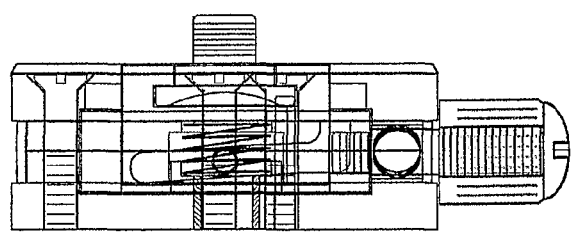

FIXING DEVICE FOR FIXING CAMERAS AND OTHER OPTICAL EQUIPMENT TO STANDS OR FOR CONNECTION TO OTHER ACCESSORIES

CROSS REFERENCE TO PRIOR APPLICATIONS

This is a U.S. national phase application under 35 U.S.C. §371 of International Patent Application No. PCT/EP/2005/010427 filed Sep. 27, 2005, and claims the benefit of German Application No. 20 2004 015 006.9 filed Sep. 27, 2004, both of them are incorporated by reference in its entirety. The International Application was published in German as International Publication No. WO/2006/040005 under PCT Article 21(2).

FIELD OF INVENTION

Fixing device for fixing cameras and other optical equipment to stands or for connection to other accessories

BACKGROUND

There are so-called quick-change adapters as fixing devices for quicker fixing of cameras and other optical equipment to stands or for connecting them to other accessory parts. These consist essentially of two parts: an adapter part, which is fixed in the stand screw thread of the camera or other optical equipment and a mounting part, which is screwed onto a stand or another accessory part. For a secure but detachable connection of a camera and stand, the adapter is inserted into the mounting part and locked there.

Most of the current solutions are based on the interlocking of a tapered guide. These devices are relatively bulky and heavy, which is of significance especially for the adapter part positioned below the camera, etc. Insertion to each other is only possible in one direction and the equipment must, therefore, be aligned accurately prior to the connection.

Methods also exist with a round adapter part. An especially small device on the market is the "mini connect" made by Novoflex. The adapter journal in this case has a diameter of 24 mm at a height of 6 mm. However, this design apart from its size has serious disadvantages: By means of an inclined surface on the adapter, the latter is unilaterally connected to the mounting part by means of a lever arranged on it, where the lever swings out widely from the housing eccentrically toward the center of the mounting part and remains in this position even after locking. The manufacturer cautions in its user manual against touching the lever, because of the danger of inadvertent disengagement of the camera from the stand, especially if the camera is carried with the stand (or by the shoulder support). Moreover, the adapter is still able to shift in the recess, even after it is inserted into the mounting part. In the worst case this has the effect that the locking lever will hold the adapter in an area of only slightly more than 2 mm. This is very dangerous, considering the fact that camera-lens combinations can easily weigh several kilograms. Moreover, this device offers no protection against accidental dropping if the camera is not locked. In the interlocked condition, the lock can be loosened by an action of medium torsion on the camera housing.

In view of recent technical requirements due to the increasing popularity of compact and ultra-slim digital cameras, the size of the quick-action fixing devices must also be reevaluated. To be able to manufacture digital cameras as small as possible, functional parts, such as the battery compartment or memory card slot are in many cases located on their underside, often directly next to the stand screw thread. Adapters with a diameter significantly larger than that of the thread insert of such cameras (approximately 10 mm), must consequently always be unscrewed, to be able to reach these parts. As a result, most of their application advantages, that is, the time saved by the quick connection are lost. Additionally, the screw thread in most cameras is located at the outer edge of the camera housing, where stable locking with an adapter that protrudes out beyond the edge is no longer assured.

Finally, the size of the adapter also plays a role in storage and transportation. As the adapter is intended to stay at all times under the camera, so as to fully utilize its primary advantage, this is not possible, if the camera with the attached adapter can no longer fit into a camera, shirt or pants pocket which is possible in particular with compact digital cameras or if the adapter's size is somewhat "awkwardly" disproportionated to the delicate design of the camera.

The problem of the invention is, therefore, the creation of a quick-action fixing device, which is small enough not to impede the other functions, which permits a spontaneous combination of camera and stand without prior special alignment, which is mechanically stable and also provides mechanically stable support to heavy camera-lens combinations and can be secured against operating errors. Finally, the adapter should be in proper proportion with the design of modern digital cameras, as a prerequisite for remaining constantly mounted to the camera housing.

This problem is solved by the features of the embodiments of the invention found below.

SUMMARY OF THE INVENTION

Advantages of the present invention should be considered that a diameter of only 14 mm and a height of 4 mm are required for the adapter journal. Even in a case where the adapter and the mounting device are connected, it is not necessary to fix the adjustment of the horizontal orientation of the camera, and no matter what the adjustment state is, it would be possible to connect both. The interlocking force acts simultaneously on approximately two-thirds of the circumferential holding area of the adapter journal (approximately 50 $mm^2$) and on two opposing sides.

After the camera is mounted to the adapter housing, the journal is automatically locked to prevent falling out. Because the locking lever moves concentrically toward the center of the mounting device, it always protrudes from the housing by the same distance needed for activation and can therefore be locked in any position against accidental loosening.

BRIEF DESCRIPTION OF THE FIGURES

The embodiments of the present invention are described in the following according to the drawings.

FIG. 1 is a plan view from the top of the lower part of the fixing device;

FIG. 2 is a plan view from below of the top part of the fixing device;

FIG. 3 is a plan cross sectional view through the fixing device with released retaining spring;

FIG. 4 is a cutout plan cross sectional view of the fixing device at a height of the locking lever with tensioned retaining spring (mounting position);

FIG. 5 is a vertical sectional view of the fixing device at a height of the locking lever;

FIG. 6 is a vertical sectional view of the fixing device at a height of the stop pin;

FIG. 7 is an exploded view of the arrangement of individual elements of FIG. 6;

FIG. 8 is an exploded view of the arrangement of individual elements of FIG. 5;

DETAILED DESCRIPTION OF THE INVENTION

Figure 5A:
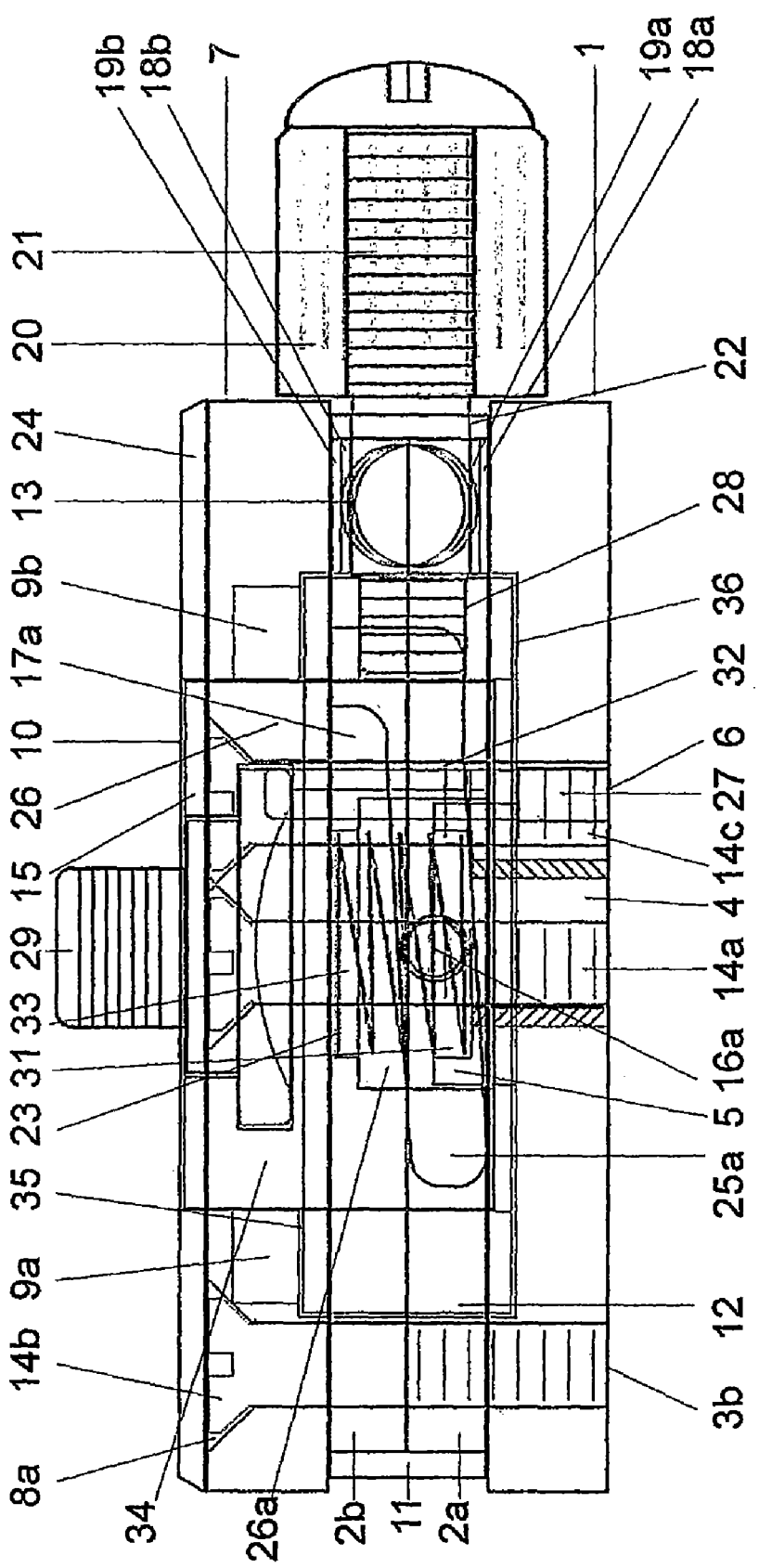
FIG. 5A is an enlarged view of FIG. 5.
Figure 9:
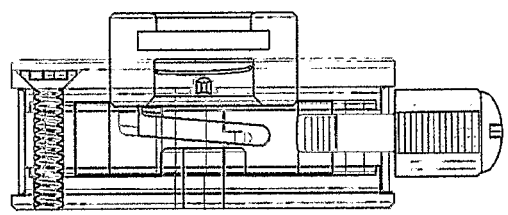
FIG. 9 is a partly dissassembled view with the inner tube pushed upward (mounting position)
Figure 10:
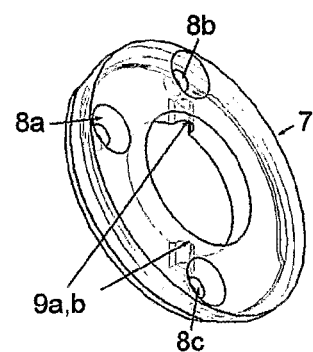
FIG. 10 is a perspective detailed view of the upper housing plate.

The quick-acting fixing device consists of two main parts: An adapter journal 29 to be screwed into the screw thread of the unillustrated camera and a mounting device 34, shown in detail, especially in FIG. 3, FIG. 4, FIG. 7 and FIG. 8.

A primary feature of the mounting device 34 is an inner tube 26, which retains the adapter journal 29. For this purpose, one side of the inner tube 26 is formed with an insert opening 15, similar to a hotshoe (flash connector), i.e. with a circumferential overlapping edge up to the insert opening 15 opened at one side, below which the adapter journal 29 is inserted. The other side the inner tube 26 has a recess 26a for retaining a compression spring 23. Two opposite locking pins 16a and 16b respectively are provided on the curved sides of the inner tube 26.

Figure 11:
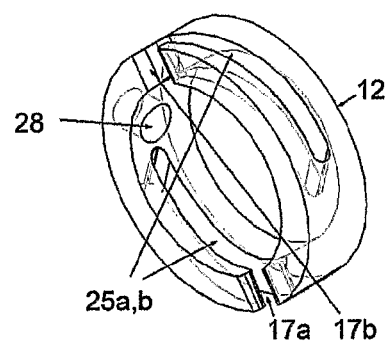
FIG. 11 is a perspective detailed view of the inner ring.
Figure 12:
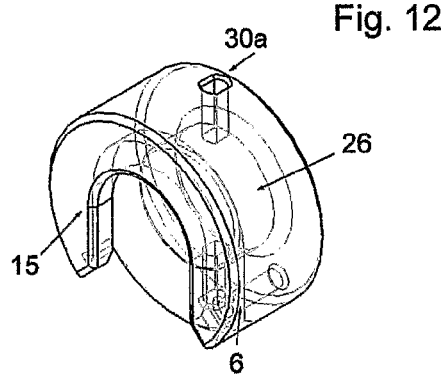
FIG. 12 is a perspective detailed view of an inner tube.

FIG. 3 and FIG. 4 show that the inner tube 26 is enclosed by an inner ring 12. This inner ring 12 has, as a primary feature, laterally opposite slits 25a and 25b respectively, extending obliquely in the longitudinal direction to the top edge and bottom edge of the ring respectively and corresponding openings 17a and 17b each, connected with the slits 25a and 25b respectively at their beginning, as can be seen in particular by the detailed drawing of FIG. 11. These openings 17a and 17b each serve for retaining locking pins 16a and 16b respectively, when the inner tube 26 in the center opening of the inner ring 12 is moved downwards.

A locking lever 21 is connected with the inner ring 12.

From this configuration the essential features of the present invention, that is as soon as locking pins 16a and 16b at the inner tube 26 are retracted into openings 17a and 17b on the upper side of the inner ring 12 and the locking lever 21 is activated, the inner ring 12 and the slit 25 are rotated, thereby pressing with its inclined surface at the slits 25 the locking pins 16a and 16b and thus, the inner tube 26 downward.

Inner tube 26 and inner ring 12 are embedded between the upper housing plate 7 and the lower housing plate 1 (see FIG. 5 to FIG. 8). The housing plates 1 and 7 are rigidly connected to one another by bolts 14a-c. The lower housing plate 1 has in its center a stand screw thread 4 and a cork or rubber overlay 24 is provided for the upper housing plate as a preferred embodiment, which serves as a slip-stopper for the camera. A compression spring 23 is provided between the housing plate 1 and the recess 26a in the inner tube 26, which pushes the inner tube 26 outward through the center hole 10 of the upper housing plate 7 up to the limit stop of pins 16a and 16b in correspondingly shaped recesses 9a and 9b respectively on the underside of the upper housing plate 7.

Furthermore, the embodiment of the present invention provides an outer ring 11, which is centered through the sockets 2a and 2b at the upper and lower housing plates 7 and 1. This ring has in essence the following two functions:

First, it closes off the entire internal area of the mounting device 34 to the outside. It can be rotated around the center axis of the housing plates 1 and 7 respectively and thereby follows the rotating movement of the locking lever 21, which is guided through the outer ring 11 to the inner ring 12.

Second, it holds a retaining spring 13 provided between sockets 2a and 2b in the recesses 18a and 18b of the lower and upper housing plates 1 and 7 respectively.

In this case, locking in place the adapter-camera unit at this time is carried out according to the following procedures:

To connect with the unillustrated camera fitted with the adapter journal 29 and the mounting device 34, the locking lever 21 is first moved clockwise into the recess 18a and 18b up to the limit stop on the housing plates 1 and 7 (FIG. 4) respectively. The retaining spring 13 is tensioned in the process. Simultaneous turning of the inner tube 26 through friction on the inner ring 12 is prevented here by at least one stop pin 27, which is fixed in a bore 6 of the lower housing plate 1 and guided through a bore 32 in the inner tube 26. In this position, the openings 17a and 17b of the inner ring 12 are located above the pins 16a and 16b, so that the inner tube 26 is pushed out of the housing unit by the compression spring 23 through the center hole 10 (FIG. 6). If the locking lever 21 is released, the retaining spring 13 presses back counterclockwise the lever and thereby also the inner ring 12. Thus the openings 17a and 17b are no longer positioned below pins 16a and 16b on the inner ring 12. If the adapter journal 29 with camera is now pushed into the insert opening 15 of the inner tube 26, the inner tube 26 cannot be deflected downward, as locking pins 16a and 16b of the tube are propped up against the upper edge of the inner ring 12 (FIG. 6). In this manner, quick and reliable insertion of the round adapter journal 29 into the hot-shoe-like fixture is possible in any horizontal camera position.

With a counteracting reactivation of lever 21, the inner ring 12 is turned correspondingly backward, and the inner tube 26a with locking pins 16a and 16b, the mounted adapter journal 29 and the camera connected to it can be pushed in with pins 16a and 16b through the openings 17a and 17b positioned below, by the lever movement into the mounting unit 34 up to the dead stop of the camera on the upper camera housing part. In the case of inadvertent release of the locking lever 21, the retaining spring 13 would immediately guide the slits 25a and 25b of the inner ring 12 through the lever-inner ring combination slightly above the pins 16a and 16b on the inner tube 26, as a result of which accidental falling out of the camera-adapter unit is prevented. For this reason the slits 25 are formed to be straight for a small distance at the beginning, before the inclined surface starts.

By pushing down the inner tube 26 after the camera-adapter unit is inserted, stop pin 27 is moved out of its bore 6 in the inner tube 26, thereby a second function is performed. That is, it prevents any kind of shifting of the adapter journal 29, as long as the camera is not locked tight, but continues to permit rotating movements around the adapter-camera axis.

To achieve locking of the camera, the locking lever 21 is operated in the counterclockwise direction, so that locking pins 16a and 16b are pushed downward by the rotating movement of the inner ring 12 into the inclined surface of slits 25, with the inner ring 12 being supported at the front by the upper housing plate 7, whereby the wall existing between slit 25 and the front side of the inner ring 12 experiences the counterpressure of the mating surface of the inner ring 12 on the underside of the housing plate 7 in recess 35 to the force of the locking pins 16. In this manner the camera-adapter unit is pulled through the inner tube 26 against the cork support at the upper housing plate 7 and thus creates a very firm connection across a large contact surface with the mounting unit 34.

Figure 13:
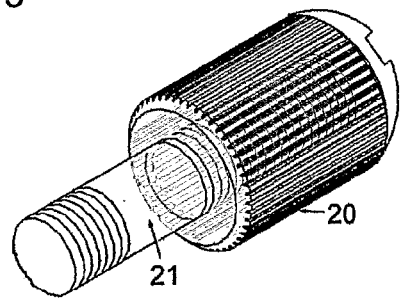
FIG. 13 is a perspective detailed view of the locking lever.
Figure 14:
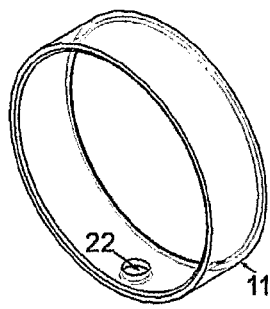
FIG. 14 is a perspective detailed view of an outer ring.

A further advantageous embodiment of the invention for additional security against release is provided by a turnable grip 20 (see FIG. 3 and FIG. 13) on the locking lever 21, with which the lever can be fixed in any position.

In an additional, unillustrated, simplified form of execution, the outer ring 11 and the locking lever 21 are omitted, wherein the slits 25 are then only formed at the inner circumference of inner ring 12 and the outer circumference of inner ring 12, provided with knurls or corrugation, serves directly as a working surface for twisting the inner ring 12 against the axially movable inner tube 26. A spring replacing the retaining spring 13 could in this case be formed, for example, as a torsion spring acting in an annular groove between the upper housing plate 7 or the lower housing plate 1 and the inner ring 12 (this description would in that case be somewhat misleading, because it would form an outer ring at the same time). In the case that the pitch of slits 25 falls below the self-retention limit of the selected material pairing between the wall of slits 25 and the locking pins 16, the additional detention through the rotary and locking grip 20 could also be eliminated, because in this version there would be no protruding locking lever 21 on which one could inadvertently get caught, thus causing the lock to be released.

What is claimed is:

1. A fixing device for fixing optical equipment to an accessory part, comprising:
   an adapter journal connectable to the optical equipment; and
   a mounting device connectable to the other accessory part, the mounting device including:
      an axially movable part having an insert opening configured to receive the adapter journal;
      a first locking pin and a second locking pin;
      an upper housing plate coupled to a lower housing plate;
      a ring turnable around the axially movable part supported on the upper housing plate and the lower housing plate, the ring having a first guide slit and a second guide slit, each guide slit having an inclined surface and an opening in communication with the respective guide slit at an end of the respective guide slit;
      a locking lever coupled to the ring;
      a compression spring biasing the axially movable part to protrude beyond the upper housing plate,
   wherein the mounting device is configured to connect the optical equipment to the upper housing plate via an insertion of the adapter journal into the insert opening by radially sliding the adapter journal on the axially movable part, a retraction of the first and second locking pins into the openings of the first and second guide slits on an upper portion of the ring, and an actuation of the locking lever is configured to rotate the ring so as to urge the axially movable part downward via an engagement of the first and second locking pins with the inclined surfaces of the first and second guide slits.

2. The fixing device according to claim 1, wherein the mounting device further includes a spring configured to urge a rotation of the ring so as to displace the openings of the first and second guide slits from a lower position of the first and second locking pins.

3. The fixing device according to claim 2, wherein the spring is disposed outside of the ring and biases the locking lever.

4. The fixing device according to claim 1, wherein the mounting device further includes an outer ring turnable with the ring.

5. The fixing device according to claim 2, wherein the mounting device further includes an outer ring turnable with the ring.

6. The fixing device according to claim 3, wherein the mounting device further includes an outer ring turnable with the ring.

* * * * *